United States Patent

Nemegeer et al.

[11] Patent Number: 5,865,000
[45] Date of Patent: Feb. 2, 1999

[54] STEEL FIBER REINFORCED CONCRETE WITH HIGH FLEXURAL STRENGTH

[75] Inventors: Dirk Nemegeer, Harelbeke; Yves Vancraeynest, Zwevegem, both of Belgium

[73] Assignee: N.V. Bekaert S.A., Zwevegem, Belgium

[21] Appl. No.: 453,829

[22] Filed: May 30, 1995

Related U.S. Application Data

[63] Continuation of Ser. No. 58,302, May 10, 1993, abandoned.

[30] Foreign Application Priority Data

May 8, 1992 [BE] Belgium .................. 09200427

[51] Int. Cl.$^6$ ...................................... E04C 1/00
[52] U.S. Cl. .................. 52/309.1; 428/399; 428/400
[58] Field of Search ................ 52/309.1, 659; 428/397, 399, 400

[56] References Cited

U.S. PATENT DOCUMENTS

| | | |
|---|---|---|
| 3,127,915 | 4/1964 | Bottomley . |
| 3,567,569 | 3/1971 | Ono et al. . |
| 3,953,953 | 5/1976 | Marsden . |
| 4,224,377 | 9/1980 | Moens ........................ 428/369 |
| 4,379,870 | 4/1983 | Matsumoto .................. 428/400 X |
| 4,565,840 | 1/1986 | Kobayashi et al. ............ 428/400 X |
| 4,585,487 | 4/1986 | Destree et al. ............... 428/400 X |
| 4,610,926 | 9/1986 | Tezuka . |
| 4,677,159 | 6/1987 | Lahalih et al. . |
| 4,801,630 | 1/1989 | Chow et al. . |
| 4,883,713 | 11/1989 | Destree et al. ............... 428/399 X |
| 4,960,649 | 10/1990 | Takata et al. . |

OTHER PUBLICATIONS

Harry Parker, Charles Merrick Gay, John W. MacGuire, "Materials and Methods of Architectural Construction", John Wiley & Sons, Inc., 1958, pp. 33–34.

*Primary Examiner*—Lanna Mai
*Attorney, Agent, or Firm*—Foley & Lardner

[57] ABSTRACT

Steel fiber reinforced concrete with very high flexural strength. A concrete composition is used with a compressive strength P of at least 80 N/mm$^2$. Mixed in the concrete are fibers made by a cold work hardening cross-section reduction operation, having a length-to-thickness ratio ranging from 60 to 120, and with a grappling form. The tensile strength T of the steel is in a proportion with respect to the compressive strength P according to the formula T/P>17.

25 Claims, 1 Drawing Sheet

STEEL FIBER REINFORCED CONCRETE WITH HIGH FLEXURAL STRENGTH

This application is a continuation of application Ser. No. 08/058,302, filed May 10, 1993 now abandoned.

BACKGROUND OF THE INVENTION

1. Field of the Invention

The invention relates to reinforced concrete, and more particularly to a steel fiber reinforced concrete with increased flexural strength, and to steel fibers for use therein.

2. Discussion of the Related Art

Steel fibers for the reinforcement of concrete are generally known. Such fibers are introduced into a mixture for the preparation of concrete and well mixed until they are equally distributed in the mixture. After hardening of the concrete, they act as a reinforcement that strengthens the concrete.

With a view to being adapted to mixing and for reinforcement, steel fibers have in general a thickness in the range of 0.3 to 1.2 millimeters, most usually in the range from 0.5 to 1 millimeter. They have generally a length-to-thickness ratio in the range from 30 to 150, most usually in the range from 50 to 100. They have generally a tensile strength in the range from 500 to 1600 Newtons per square millimeter, most usually from 900 to 1300 N/mm$^2$. When less than 500 N/mm$^2$, then the fibers exhibit too low a resistance to deformation at rupture of the concrete, such that the concrete would then exhibit a brittle behaviour at rupture. Conversely, when more than 1300 N/mm$^2$, the brittle behaviour of the concrete is sufficiently avoided, but the increased tensile strength of the steel does not further increase the flexural strength of the concrete.

The reinforcing effect of the steel fibers manifests itself specifically in the increase of the flexural strength of the concrete. The flexural strength is the tensile strength of the concrete at rupture of the beam, in a concrete beam under flexural loading and at the location where the maximal tension appears. The so-called modulus of rupture is representative of the flexural strength. The modulus of the rupture is the value δ obtained by the formula:

$$\delta = P \times L \times B / H^2,$$

in which:

L=the span length between the two supporting points of a test beam that is loaded in flexure by means of a load that for one half-load acts at a distance of one-third of the span length from one supporting point, and for the other half-load acts at a distance of one-third of the span length from the other supporting point;

B=the breadth of that test beam;

H=the height of that test beam; and

P=the sum of the above-mentioned half-loads, at rupture.

The value obtained by this formula corresponds in fact to the tension at rupture in the part of the beam in the region under tension which is the most distant from the neutral plane, calculated as if that rupture would still be located in the linear part of the stress/strain curve. Due to the presence of the fibers, however, the concrete still does not show a brittle rupture after the first crack, but the stress/strain curve raises further in a non-linear manner towards a maximum, with the result that the concrete shows a post-crack resistance that is considerably higher than the first-crack resistance. In this way, the fibers produce a considerably higher increase of the flexural strength, as observed via the modulus of rupture.

It is known that the flexural strength produced by the metal fibers is given, in first approximation, by the formula:

$$F = B \times p \times L/D \qquad (1)$$

in which:

B=a constant that depends on the degree of anchoring and on the orientation of the fibers in the concrete, and that, in first approximation, is independent of the tensile strength of the steel of the fiber;

p=the percentage by volume of fibers in the concrete; and

L/D=the length-to-diameter ratio of the fiber used.

It is known to use fibers with grappling form, that is, fibers with a shape that differs from the straight shape with constant cross-section over the length, in order to obtain a degree of anchoring of the fibers that is as high as possible. There are, for instance, fibers that are provided with incurvations or undulations, either over the whole or part of their length, or only at the extremities, such as hook-shaped incurvations. Similarly, there are fibers of which the cross-section profile changes over the length, such as thickenings, alternating with thinner parts, or a flattened profile that alternates with a round profile, either over the whole length, or only at the extremities, such as thickenings in the form of a nail head at each of the extremities. These deformations can be used alone or in combination with each other. The increase of the degree of anchoring can be obtained by the use of such fibers with grappling form, and can further be obtained or increased by the roughening of the fiber surface.

Besides the improvement of the degree of anchoring, it is also known that an L/D-ratio should be chosen that is as high as possible, at any rate more than 50. However, when the fibers are made by a cold work-hardening cross-section reduction operation, such as by cold rolling or drawing or elongating, and a ratio is taken above about 120 to 130, then, using an acceptable length of 2.5 to 10 centimeters for the mixing, the diameter unfortunately becomes too small for still being economically acceptable. The manufacturing cost of the fiber per kilogram increases as the fiber is thinner. One can not indefinitely raise the L/D-ratio, as there is a such a limitation.

When willing to further drive up the flexural strength of the concrete, using such an optimalized fiber for efficiency, one should then be willing, according to formula (1), to introduce in the concrete a portion p of fibers that is as high as possible. Again there is also a practical limitation, determined by the mixability of the fibers. The higher indeed the L/D-ratio, the more difficult to mix the fibers together in the concrete without danger of balling-up. This means that a higher L/D-ratio corresponds to a lower maximum percentage in volume that can be mixed in the concrete. The limit of mixability can be determined by experiment, as for example shown in U.S. Pat. No. 4,224,377, by the approximative formula:

$$p \times (L/D)^{1.5} = maximum\ 1100,$$

wherein this maximum value can be increased to a certain extent by special measures taken to improve the mixability, such as introducing the fibers in a form where they are glued together, as known from the above U.S. patent.

SUMMARY OF THE INVENTION

When taking into account the above limitations, it has been established that, for fibers that are made by a cold work-hardening cross-section reduction operation, the manufacturing economy and the efficiency in the concrete can be best reconciled with each other in the L/D-ratio range from about 70 to about 100. The percentages by volume that then correspond herewith are situated around 1.8% and 1.1% respectively, depending on the measures that may or may not be taken in order to improve the mixability.

Therefore, it is an object of the present invention to provide a steel fiber reinforced concrete, and also the steel fibers therefor, where the flexural strength of the concrete is still further increased, however without the concrete losing any toughness and consequently showing a brittle behaviour at rupture.

In accordance with one aspect of the invention, reinforced concrete includes concrete material. A plurality of steel fibers are incorporated therein. The steel fibers have a work hardened metallographic structure, a length-to-thickness ratio in the range of 60 to 120, and have a deformation. The concrete material has a compressive strength P of at least 80 Newtons per square millimeter, without the fibers. The steel fibers have a tensile strength T in proportion to the compressive strength P according to the formula:

$$T/P > 17.$$

In accordance with another preferred aspect of the invention, the tensile strength T is in proportion to the compressive strength P according to the formula:

$$T/P < 22.$$

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention will be described with reference to the drawings, in which.

DETAILED DESCRIPTION OF THE PREFERRED EMBODIMENTS

Figure 1:
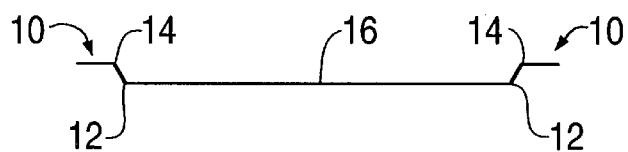
FIG. 1 represents the form of a steel fiber, as used in the comparative test described hereunder.

According to one embodiment of the invention, a fiber is used, which is made by a cold work hardening cross-section reduction operation. The fiber has a grappling form as defined herein, with an L/D-ratio in the range from about 60 to 120, preferably from about 70 to 100. A concrete is used with a compressive strength P, without fiber, of at least 80 Newtons per square millimeter. The tensile strength T of the steel is in a proportion with respect to said compressive strength P, according to the formula:

$$T/P > 17.$$

For a concrete with a compressive strength of 100 N/mm², the tensile strength of the fibers shall consequently amount to at least 1700 N/mm². If less, then the concrete risks to have too brittle a behaviour at rupture. It is, however, not necessary that the tensile strength be much greater than 30% above the minimum tensile strength according to the formula above, because the excess tensile strength should not add any appreciable flexural strength to the concrete. Although the choice of the tensile strength above the minimum remains free, a tensile strength T shall preferably be chosen, in a proportion to the same compressive strength P, according to the formula:

$$T/P < 22.$$

The desired tensile strength T can easily be realized by the fact that the fibers are made of steel with work hardened metallographic structure, as obtained by the cold cross-section reduction by rolling or by wire-drawing. Thereby, the tensile strength can rather accurately be obtained by means of the degree of reduction.

The compressive strength P of a concrete material is the strength as measured by ASTM-Standard No. C39-80 (expressly incorporated by reference) on a cube of concrete of 150 mm edge, where the cube is pressed between two parallel surfaces until rupture. The compressive strength is then equal to the compressing force at rupture, divided by the surface of one face of the cube. This compressive strength appears to be a factor for further enhanced efficiency of the fiber with respect to flexural strength. In conventional concrete, such compressive strength P conventionally amounts until now to about 30 to 50 N/mm², whereas, in the invention, values are taken over 80 N/mm². However, it is advantageous to increase the tensile strength T of the fibers, together with increasing the compressive strength of the concrete material, in order to avoid the brittle behaviour of the concrete.

A concrete with a compressive strength above 80 N/mm² can be obtained by separately known means that are used in combination. On one hand, there are the usual inert fillers, such as sand, gravel and ground limestone, with an additional portion of 5 to 10% of the cement weight in the form of very fine filler material, such as micropozzolana and silica-fume, and an addition of a sufficient quantity of superplasticizer, in order to neutralize the increase of water requirement caused by the fine filler material. On the other hand, a water-to-cement ratio is held lower than 0.4, preferably between 0.30 and 0.35. The so-called silica-fume is an ultra-fine material, in the range of more than 5000 m² of specific surface per kilogram, that precipitates in the smoke-filters of the electric furnaces for the manufacturing of silicon, and that mainly consists of amorphous $SiO_2$.

The known superplasticizers are water reducing additives such as carbohydrates or alkali- or earth-alkali metal salts of ligno-sulphonic acids or of hydroxy-carboxylic acids.

For determining the thickness D of fibers with non-round cross-section, the diameter is taken of the circle having the surface of that cross-section. When this section is not the same over the length of the fiber, then the average surface is taken over the length.

The invention will here further be explained with reference to an example, to comparative tests conducted therewith, and with reference to the drawings.

Concrete Composition and Comparative Test Results

Example 1 (Reference)

| | |
|---|---|
| Cement HK40: | 375 kg |
| Sand | |
| 0/2: | 300 kg |
| 0/5: | 480 kg |
| Gravel | |
| 4/14: | 1000 kg |
| 4/28: | 200 kg |
| Water: | 180 kg |
| Fibers: | 40 kg |
| Compressive strength (N/mm$^2$) with fibers: | 49.6 |

Examples 2 and 3

| | |
|---|---|
| Cement P40: | 400 kg |
| Sand 0/5: | 640 kg |
| Gravel | |
| 4/7: | 585 kg |
| 7/14: | 585 kg |
| Micropozzolana S.F.: | 40 kg |
| Plasticizer Pozolith 400N: | 2.5% |
| Water: | 132 kg |
| Fibers: | 40 kg |
| Compressive strength (N/mm$^2$) with fibers | |
| example 2: | 97.4 |
| example 3: | 101.8 |
| without fibers: | 99.9 |

Figure 2:
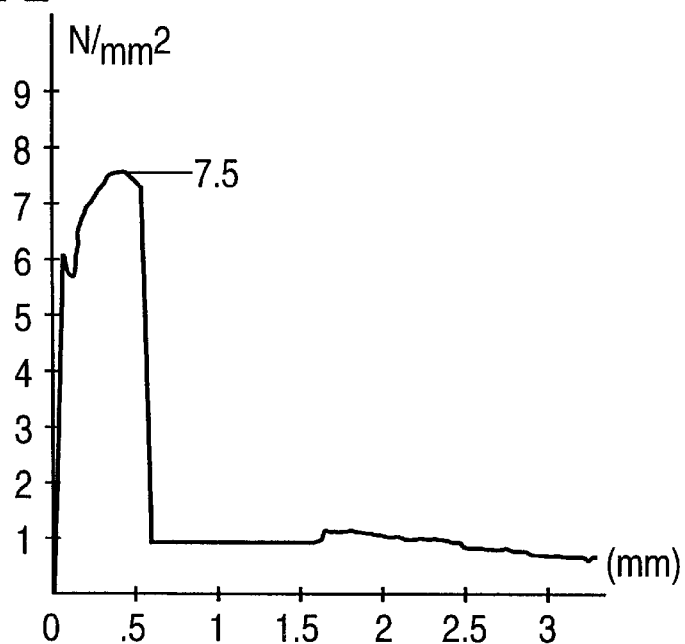
FIG. 2 shows a diagram of flexural strength versus deflection, for a concrete beam with concrete according to example 2 hereunder, having insufficient tensile strength of the fibers, and where a brittle behaviour can be observed.
Figure 3:
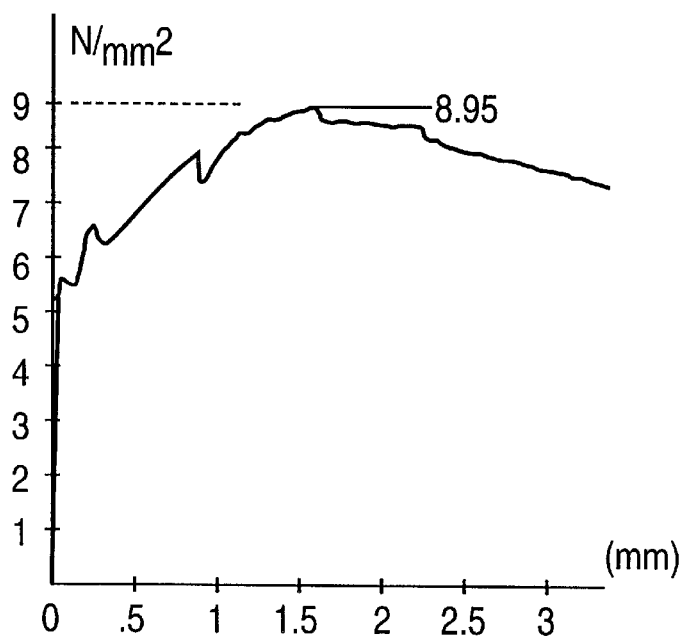
FIG. 3 shows a diagram of flexural strength versus deflection, for a concrete beam with concrete according to example 3 hereunder, where the conditions according to the invention are fulfilled.

Fibers:
Form:
  illustrated in FIG. 1: mainly straight with incurved extremities, 10, the incurved extremities having a first angle of about 45° 12, followed at about 3 mm distance by a same angle in the other direction 14, followed at about 3 mm distance in the same direction as the central part 16 by the end of extremity 10;
Cross-section:
  round, with a diameter D of 0.8 mm;
Length:
  60 mm. (L/D-ratio=75); and
Tensile strength:
  examples 1 and 2: 1175 N/mm$^2$
  example 3: 2162 N/mm$^2$.
Obtained flexural strength (after 28 days), in N/mm$^2$:
  (bending load on a beam under two equal loads, each at one third part of the span length on either side of the beam)
Example 1: 4.2;
Example 2: 7.5. Brittle behaviour at rupture (illustrated in FIG. 2); and
Example 3: 8.95. Brittle behaviour avoided (illustrated in FIG. 3).

It is clear that the invention is not limited to fibers with the sort of deformation in hooked form at the extremities as shown here, but that the invention is applicable to all other sorts of deformations, alone or in combination with each other, (and with all sorts of roughenings of the surface,) as described above.

The concrete according to the invention can be applied in all sorts of structural elements where a high flexural strength is required, together with an extreme toughness of the concrete, and more particularly in concrete beams for high buildings, in road surfacing on bridges, and in tunnel ceilings.

While specific embodiments of the invention have been described and illustrated, it will be clear that variations in the details of the embodiments specifically illustrated and described may be made without departing from the true spirit and scope of the invention as defined in the appended claims.

What is claimed is:

1. Reinforced concrete comprising:
   (a) concrete material;
   (b) a plurality of fibers incorporated therein, having a work hardened metallographic structure, and having a length-to-thickness ratio in the range of 60 to 120, and having a deformation;
   (c) the concrete material having a compressive strength P of at least 80 Newtons per square millimeter without fibers;
   (d) the fibers having a tensile strength T in proportion to said compressive strength P according to the formula:

$T/P > 17$.

2. Reinforced concrete according to claim 1, wherein said tensile strength T is further in proportion to said compressive strength P according to the formula:

$T/P < 22$.

3. Reinforced concrete according to claim 1, wherein the length-to-thickness ratio is in the range of 70 to 100.

4. Reinforced concrete according to claim 1, further comprising:
   (e) a fine filler in the concrete material; and
   (f) superplacticizer in the concrete material.

5. Reinforced concrete according to claim 4, further comprising inert filler.

6. Reinforced concrete according to claim 4, wherein the concrete material includes cement, and the fine filler material is in a proportion of from 5 to 10% of a weight of the cement.

7. Reinforced concrete according to claim 6, wherein an amount of water required has a water-to-cement ratio lower than 0.4.

8. Reinforced concrete according to claim 7, wherein the water-to-cement ratio is in a range of 0.30 to 0.35.

9. Reinforced concrete according to claim 1, wherein the deformation includes a grappling form.

10. Reinforced concrete according to claim 9, wherein the grappling form includes at least one incurved extremity.

11. Reinforced concrete according to claim 10, wherein the incurved extremity includes:
    (a) a first angle of about 45°;
    (b) a second angle of about 45° following the first angle at a distance; and
    (c) an end of the extremity following the second angle at a distance.

12. Reinforced concrete according to claim 1, wherein the deformation includes a roughened surface.

13. Reinforced concrete according to claim 1, wherein the fibers include steel.

14. A method of reinforcing concrete comprising the steps of:
    (a) providing a concrete material having a compressive strength P of at least 80 Newtons per square millimeter without fibers;
    (b) providing a plurality of fibers having a work hardened metallographic structure, having a length-to-thickness ratio in the range of 60 to 120, having a deformation, and having a tensile strength T in proportion to said compressive strength P according to the formula:

$$T/P > 17;$$

and (c) incorporating the fibers into the concrete material.

15. A method according to claim 14, wherein said tensile strength T is further in proportion to said compressive strength P according to the formula:

$$T/P < 22.$$

16. A method according to claim 14, wherein the length-to-thickness ratio is in the range of 70 to 100.

17. A method according to claim 14, further comprising the steps of:

(e) incorporating a fine filler in the concrete material; and (f) incorporating a superplacticizer in the concrete material.

18. A method according to claim 17, wherein the fine filler material is incorporated into the concrete material in a proportion of from 5 to 10% of a weight of the cement.

19. A method according to claim 18, further comprising the step of incorporating an amount of water at a water-to-cement ratio lower than 0.4.

20. A method according to claim 19 wherein the water-to-cement ratio is in a range of 0.30 to 0.35.

21. A method according to claim 14, further comprising the step of incorporating inert filler into the concrete material.

22. A method according to claim 14, further comprising the step of forming the deformation including forming a grappling form.

23. A method according to claim 22, wherein the step of forming the grappling form includes the step of forming at least one incurved extremity.

24. A method according to claim 23, wherein the step of forming the incurved extremity includes the steps of:

(a) forming a first angle of about 45°;

(b) forming a second angle of about 45° following the first angle at a distance; and (c) terminating the extremity following the second angle at a distance.

25. A method according to claim 14, further comprising the step of forming the deformation including forming a roughened surface.

* * * * *